3,278,332
METHOD OF APPLYING PORCELAIN ENAMEL
TO METAL
William E. Waxter and Alvin Richmond, Baltimore, Md., assignors to W. R. Grace & Co., New York, N.Y., a corporation of Connecticut
No Drawing. Filed July 30, 1963, Ser. No. 298,564
2 Claims. (Cl. 117—129)

This invention relates to improvements in porcelain enamel coatings. In one specific aspect it relates to improvements in porcelain enamel coatings containing silica as a suspending aid.

There is a trend in the commercial porcelain enamel field to lower firing temperatures so that lighter steels can be used. During the last ten years, firing temperatures have dropped 200° F., with cover coats being fired at 1350 to 1380° F. At these lower temperatures clay which is the normal suspending aid in porcelain enamel slips, gasses causing undesirable bubble structures in the enamel surface. Clay containing coatings also have poor acid resistance and an off white color.

When silica is substituted for clay as a suspending aid in these porcelain enamel coatings, a bluish white color with high reflectance is obtained, along with superior acid and abrasion resistance.

However, porcelain enamel coatings containing silica have a poor bisque strength. The bisque strength being the hardness of an unfired enamel coat. This low bisque strength has been a serious obstacle to the general commercial acceptance of silica as a suspending aid in the preparation of porcelain enamel coatings.

It is therefore an object of this invention to provide a method for increasing the bisque strength of porcelain enamel coatings containing silica as a suspending aid.

Briefly, in the preparation of porcelain enamel coatings, the various ingredients constituting a coating are blended together by milling and then applied (usually by spraying) to a metal panel. The coated panels are then oven-dried at approximately 200° F. The coatings at this point are no longer fluid and adhere to the metal panel with a high bisque strength that will withstand handling and flexing without separation. This drying step is followed by the final firing or fusing of the enamel coat to the panel.

We have found that the bisque strength of silica-containing porcelain enamel coating can be substantially increased by drying said coating at a temperature of from about 445 to 500° F.

The silica that may be used in this invention is fine-sized silica having a particle size of from about 10 millimicrons to 25 microns. The preferred particle size range is from about 2 to 10 microns.

The drying time of the enamel slip is not critical, it is only necessary that the time be sufficient to dry the slip.

This invention is equally applicable to both ground and cover coats. Ground coats are applied directly to the metal, while cover coats are applied to a ground coat.

Besides the trend to lower firing temperatures, the porcelain enamel industry is also using one coat applications; that is the cover coat serves as both the ground and cover coat. Because the advantages of silica (e.g. high reflectance, acid and abrasion resistance) are put to more effective use in a cover coat, it is apparent that the preferred use of this invention will be on cover coats of porcelain enamel.

This invention is illustrated but not limited by the following detailed description and specific example.

EXAMPLE I

Porcelain enamel slips were prepared using the formulations of Table I and Table II.

Table I.—Clay as a suspending aid

| | Gms. |
|---|---|
| Frit | 1000 |
| Clay | 40 |
| Bentonite | 3.8 |
| Magnesium carbonate | 1.25 |
| Aluminum hydrate | 0.94 |
| Sodium aluminate | 1.25 |
| Gum tragacanth | 0.63 |

Water, varied according to grinding conditions.

Table II.—Fine size silica as a suspending aid

| | Gms. |
|---|---|
| Frit | 1000 |
| Fine-sized silica (Syloid 255, W. R. Grace & Co.) | 15–20 |
| Bentonite | 3.8 |
| Magnesium carbonate | 1.25 |
| Aluminum hydrate | 0.94 |
| Sodium aluminate | 1.25 |
| Gum tragacanth | 0.63 |

Water, varied according to grinding conditions.

Standard commercial procedures were followed in preparing the porcelain enamel coatings, the following being a typical procedure. The only modification being scaling it down for small batch operations.

A one gallon porcelain lined mill was charged as follows:

4.6 pounds—1 inch porcelain balls
2.0 pounds—¾ inch porcelain balls (Formulation of Table I or Table II)

This charge filled the mill approximately ⅔ full, and was ground for 3½ to 3¾ hours at a mill speed of approximately 75 r.p.m.

After milling, the fineness of the ground enamel slip was determined by removing a 50 cc. portion from the mill and pouring it onto a 200 mesh screen. The material was washed until no more would pass through the screen and the residue dried at 200° F. and weighed. The weight of this residue for cover coats should not exceed ½ to 1 gm.

We found the clay formulation required an initial charge of 500 cc. of water to pass the fineness test, while the silica formulation required only 450 cc. of initial water charge.

When the proper degree of fineness was achieved, the contents of the mill were dumped onto a 12 mesh screen to catch the balls and then drained through a 60 mesh screen to remove any unground frit. Draining can be aided by placing the catch pan and screen on a vibrating table. The consistency of the slip was measured by dipping a 4 x 12 inch pickled mild steel panel into the slip and positioning this panel on a rack to allow the excess enamel to drain. The pickup weight of the panel was determined and in cover coats did not exceed 21±0.5 gms. The specific gravity of the cover coats was from 1.66 to 1.77 gms./cc.

The panels were 6 x 8 inch metal panels to which a ground coat had been previously applied. The cover coat was applied with a standard commercial spray gun using approximately 40 lbs. of air pressure. All panels were sprayed to a pickup weight of approximately 11 gms.

After spraying the panels were oven-dried. The clay containing coatings were dried at 200° F. (an acceptable commercial temperature) while the silica containing coatings were dried at 200° F. and at temperatures between 445 and 500° F.

The dried spray coat of porcelain enamel is called a bisque coat, the strength of which is the bisque strength. This coat should be loose and porous and should have the ability to withstand strains when bending. The measure of this is the tearing strength. In testing the tearing strength, a 4 x 12 inch unfired enamel sheet was suspended on a rack between two metal rollers approximately 8 inches apart. A third metal roller was placed under the exact center of the panel on a lift jack which was raised to specified height in order to flex the panel. Flexures of 1/8 inch, 5/16 inch and 1/2 inch were applied. These correspond to bends of 5 degrees, 15 degrees and 25 degrees. This tearing strength test is designed to simulate the stresses a large unfired enamel coating (such as a refrigerator panel) would be subjected to in actual commercial production.

After the panels were flexed, they were fired in a muffle furnace at 1350° F. for 3½ minutes, then cooled and the surface examined. A weak bisque coat shows up in the fired panel in the form of cracks, both large and hairline or in the form of fish scales.

The presence of cracks around the area of flexure, is evidence of a poor coating, the degree of which is determined by the length of the cracks. The cracks are parallel to the line of flex and are measured by the distance from the center of the flexure.

Panels coated with the formulations of Table I and Table II were prepared and tested for bisque strength as described above. The results are shown in Table III.

These results show that by the use of this invention, that is the drying of silica containing unfired porcelain enamel coatings at a temperature of from 445 to 500° F. substantially increases the bisque strength of the coating over that which had been previously obtained in the prior art.

*Table III*

| Panel No. | Suspending aid | Grinding time, hrs. | Fineness, gms. | Specific Gravity, gms./cc. | Drying Temperature, °F. | Height of Bend, inches | Total Spread of Hairline cracks, inches |
|---|---|---|---|---|---|---|---|
| 1 | Clay | 3.5 | 0.7 | 1.66 | 200 | 5/16 | 0 |
| 2 | do | 3.5 | 0.7 | 1.66 | 200 | 7/16 | 0 |
| 3 | do | 3.5 | 0.7 | 1.66 | 200 | 1/2 | 3/8 |
| 4 | Fine-sized silica | 3.5 | 0.1 | 1.756 | 200 | 5/16 | 5/8 |
| 5 | do | 3.5 | 0.1 | 1.756 | 200 | 1/2 | 3½ |
| 6 | do | 3.5 | 0.2 | 1.723 | 445 | 1/2 | 5/8 |
| 7 | do | 3.5 | 0.2 | 1.723 | 473 | 1/2 | 3/16 |
| 8 | do | 3.5 | 0.2 | 1.723 | 473 | 5/16 | 0 |
| 9 | do | 3.5 | 0.2 | 1.723 | 500 | 1/2 | 3/4 |

We have shown that by the use of this invention, we are able to obtain silica containing porcelain enamel coatings which have a high bisque strength in the unfired state and when fired exhibit the superior qualities of improved color, high reflectance, acid and abrasion resistance imparted to it by the silica.

We claim:

1. In a method for preparing porcelain enamel coatings which comprises, incorporating a fine-sized silica in a porcelain enamel slip, applying said slip to a substrate material, drying said coated substrate material and firing said dried coated substrate material to obtain a vitrified coating on said substrate material, the improvement which comprises drying said coated substrate material at a temperature of from about 445 to 500° F.

2. The method according to claim 1 wherein the fine-sized silica has a particle size of from about 2 to 10 microns.

References Cited by the Examiner

UNITED STATES PATENTS 2,680,085  6/1954  Raeuber et al. ____ 117—129 X
2,827,393  3/1958  Kadisch et al. ____ 117—129 X

OTHER REFERENCES

Randau: Enamels and Enameling, London, Scott, Greenwood and Co., 1900, pp. 143, 144.

ALFRED L. LEAVITT, *Primary Examiner.*

R. S. KENDALL, *Examiner.*